United States Patent
Wu

(10) Patent No.: US 11,059,980 B2
(45) Date of Patent: Jul. 13, 2021

(54) EMULSION POLYMERS AND STAIN RESISTANT COATING COMPOSITIONS MADE THEREFROM

(71) Applicant: Arkema Inc., King of Prussia, PA (US)

(72) Inventor: Wenjun Wu, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 76 days.

(21) Appl. No.: 15/777,696

(22) PCT Filed: Nov. 30, 2016

(86) PCT No.: PCT/US2016/064149
§ 371 (c)(1),
(2) Date: May 21, 2018

(87) PCT Pub. No.: WO2017/095881
PCT Pub. Date: Jun. 8, 2017

(65) Prior Publication Data
US 2018/0371260 A1    Dec. 27, 2018

Related U.S. Application Data

(60) Provisional application No. 62/261,952, filed on Dec. 2, 2015.

(51) Int. Cl.
| | | |
|---|---|---|
| C08F 230/02 | (2006.01) | |
| C09D 143/02 | (2006.01) | |
| C09D 5/02 | (2006.01) | |
| C08F 220/18 | (2006.01) | |
| C09D 133/14 | (2006.01) | |
| C09D 113/02 | (2006.01) | |
| C09J 133/14 | (2006.01) | |
| C09J 143/02 | (2006.01) | |
| C09D 4/00 | (2006.01) | |
| C09D 5/00 | (2006.01) | |
| C09D 133/12 | (2006.01) | |

(52) U.S. Cl.
CPC ............ *C09D 5/022* (2013.01); *C08F 220/18* (2013.01); *C09D 4/00* (2013.01); *C09D 5/00* (2013.01); *C09D 113/02* (2013.01); *C09D 133/12* (2013.01); *C09D 133/14* (2013.01); *C09D 143/02* (2013.01); *C09J 133/14* (2013.01); *C09J 143/02* (2013.01)

(58) Field of Classification Search
CPC ..... C08F 230/02; C08F 220/18; C09D 143/02
See application file for complete search history.

(56) References Cited

U.S. PATENT DOCUMENTS

| | | | |
|---|---|---|---|
| 3,736,287 A | 5/1973 | Patella | |
| 3,749,690 A | 7/1973 | Patella | |
| 4,325,856 A | 4/1982 | Ishikawa et al. | |
| 5,312,863 A | 5/1994 | Van Rheenen et al. | |
| 5,679,719 A | 10/1997 | Klemarczyk et al. | |
| 6,485,785 B1 | 11/2002 | Mino et al. | |
| 6,485,786 B2 * | 11/2002 | Deng | C09D 133/062 427/385.5 |
| 6,534,597 B2 * | 3/2003 | Adam | C08F 2/24 525/255 |
| 6,710,161 B2 * | 3/2004 | Bardman | C08F 220/18 524/126 |
| 6,756,459 B2 * | 6/2004 | Larson | C08F 257/02 524/547 |
| 8,158,713 B2 | 4/2012 | Finegan et al. | |
| 8,158,714 B2 | 4/2012 | Nair et al. | |
| 8,318,848 B2 * | 11/2012 | Finegan | C08F 220/18 524/497 |
| 2008/0269402 A1 * | 10/2008 | Maurice | C08F 220/14 524/547 |
| 2012/0058277 A1 | 3/2012 | Bohling et al. | |
| 2015/0051334 A1 * | 2/2015 | Wu | C09D 113/02 524/533 |
| 2015/0232685 A1 * | 8/2015 | Wang | C09D 151/10 523/205 |
| 2018/0346735 A1 * | 12/2018 | Wu | C09D 133/14 |

FOREIGN PATENT DOCUMENTS

| | | | | |
|---|---|---|---|---|
| CN | 103555174 | | 2/2014 | |
| CN | 103555174 A | * | 2/2014 | ........... C09D 175/04 |
| EP | 221 498 A2 | * | 5/1987 | ........... C08F 246/00 |
| EP | 1 988 105 A1 | | 11/2008 | |
| EP | 1 582 567 B2 | | 11/2011 | |

OTHER PUBLICATIONS

U.S. Appl. No. 15/777,690, dated May 21, 2018, Wu.

* cited by examiner

*Primary Examiner* — Rip A Lee
(74) *Attorney, Agent, or Firm* — Lynn B. Morreale

(57) ABSTRACT

Emulsion polymers and coating compositions made therefrom that exhibit exceptional stain resistance to both hydrophilic and hydrophobic stains. The emulsion polymers include, as polymerized units: a) at least one ethylenically unsaturated nonionic monomer in an amount ranging between about 85 wt. % to less than 100 wt. % based on the overall weight of the polymer composition; b) a first acid monomer in an amount ranging from about 0.1 to 2 wt. %, the first monomer being a strong acid monomer selected as a phosphorus-based acid monomer, a sulfur-based acid monomer, or a mixture thereof, and c) a second acid monomer in an amount ranging from about 0.1 to 2 wt. %, the second monomer being one or more ethylenically unsaturated monomers having at least one carboxyl or carboxylic anhydride functional group. The relative amounts of the first and second acid monomers are such that the ratio of b/c is greater than 0.7.

12 Claims, No Drawings

EMULSION POLYMERS AND STAIN RESISTANT COATING COMPOSITIONS MADE THEREFROM

CROSS-REFERENCE TO RELATED APPLICATIONS

This application is a national stage application under 35 U.S.C. § 371 of PCT/US2016/064,149 filed Nov. 30, 2016, which claims benefit to U.S. patent application Ser. No. 62/261,952, filed, Dec. 2, 2015.

This application is related to and claims the benefit of U.S. Provisional Application Ser. No. 62/261,952, entitled EMULSION POLYMERS AND LOW VOC COATING COMPOSITIONS MADE THEREFROM filed on Dec. 2, 2015, the contents of which are incorporated herein by reference.

FIELD OF THE INVENTION

This disclosure relates generally to emulsion polymers used in coatings, adhesives, sealants, and the like. More specifically, this disclosure relates to coating compositions that include emulsion polymers that provide the resulting film or coating layer with resistance to a wide range of hydrophilic and hydrophobic stains.

BACKGROUND OF THE INVENTION

The statements in this section merely provide background information related to the present invention and may not constitute prior art.

Stain resistance is a desirable property for any coating that is to be applied to the surface of a substrate. However, stain resistance is lacking in most commercial latex paints and particularly hard to attain in "flat" interior wall paints. Adding to this challenge is the wide variations in chemical and physical characteristics of the different household stains encountered.

Polymers that contain strong acid groups are used in a variety of coatings, inks, and adhesives. The strong acid groups provide for improved adhesion of the polymer to substrates, form crosslinks in the presence of divalent metal ions, and promote adsorption of the polymer onto pigment particles, such as titanium dioxide. U.S. Pat. Nos. 8,158,713 and 8,318,848 provide waterborne coating compositions that include a vinyl copolymer having phosphorous-containing functional groups. U.S. Pat. No. 6,485,786 62 discloses an aqueous stain-blocking coating composition that includes an aqueous emulsion copolymer having polymerized units derived from an ethylenically unsaturated nonionic monomer and an ethylenically unsaturated strong acid monomer. U.S. Pat. No. 6,710,161 describes a polymer composition that includes co-polymer particles bearing phosphorus acid groups dispersed in an aqueous medium. U.S. Pat. No. 6,756,459 sets forth a binder composition that comprises an aqueous emulsion copolymer having polymerized units derived from an ethylenically unsaturated monomer and a phosphorous containing monomer. EP Patent No. 1,988,105 discloses an aqueous copolymer dispersion obtained from a mixture of an ethylenically unsaturated nonionic monomer, a phosphorous-containing monomer, an alkoxysilane functional monomer, and a sulfur-based monomer.

SUMMARY OF THE INVENTION

The present invention generally provides an emulsion polymer comprising, as polymerized units:
a) at least one ethylenically unsaturated nonionic monomer in an amount ranging between about 85 wt. % to less than 100 wt. %, preferably about 89% to 99.5 wt. %, based on the overall weight of the polymer composition;
b) a first acid monomer in an amount ranging from about 0.1 to 2 wt. %, preferably about 0.5 to 1.5 wt. %, the first monomer being a strong acid monomer selected as a phosphorus-based acid monomer, a sulfur-based acid monomer, or a mixture thereof, and
c) a second acid monomer in an amount ranging from about 0.1 to 2 wt. %, preferably about 0.5 to 1.5 wt. %, the second monomer being one or more ethylenically unsaturated monomers having at least one carboxyl or carboxylic anhydride functional group;

The relative amounts of the first and second acid monomers are such that the ratio of b/c is greater than 0.7; alternatively, the ratio of b/c is between about 1 and 10; alternatively, the ratio of b/c is between about 1 and about 5, preferably between about 1 and 4. The polymer composition exhibits a glass transition temperature ($T_g$) ranging from −30° C. to 30° C.

According to one aspect of the present disclosure, the ethylenically unsaturated nonionic monomer may be without limitation any (meth)acrylate, vinyl ester, styrene and substituted styrene, with butyl acrylate, methyl methacrylate, unsubstituted or substituted styrene, acrylic monomer, or a mixture thereof being preferred, while the first acid monomer is ethyl methacrylate phosphate, phosphate esters of polypropylene glycol mono(meth)acrylate, phosphate esters of polyethylene glycol mono(meth)acrylate, or a mixture thereof and the second acid monomer is methacrylic acid.

According to another aspect of the present disclosure, a coating composition is provided that comprises the emulsion polymer dispersed in an aqueous medium. The emulsion polymer may be present in an amount ranging from about 10 to 50 wt. % based on the entire weight of the coating composition. The coating composition may further comprise an organic pigment, and inorganic pigment, or a mixture thereof. When desirable, the coating composition may also comprise one or more additives, including but not limited to, surfactants, dispersants, extenders, rheology modifiers, defoamers, coalescent agents, and opacifiers.

According to yet another aspect of the present disclosure, a method of using the coating composition includes applying the composition to a surface of a substrate to form a film or coating layer on the surface, such that the film or coating layer is resistant to hydrophilic stains and hydrophobic stains. The total ΔE measured for the resistance of the coating composition to the hydrophilic stains and hydrophobic stains is less than about 80. In some embodiments, the total ΔE measured for the resistance of the coating composition to hydrophilic stains being less than about 35, the total ΔE measured for the resistance of the coating composition to hydrophobic stains being less than about 40, and the ΔE measured for the resistance of the coating composition to the consumer union stain being less than about 2.

The hydrophilic stains include mustard, ketchup, wine, coffee, and fountain ink, while the hydrophobic stains include ballpoint pen, No. 2 pencil, blue crayon, red grease pencil, two red lipsticks (lipstick #1 or CoverGirl Hot Passion, and lipstick #2 or Maybelline Royal Red), and a consumer union black stain.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is in no way intended to limit the present disclosure or its application or uses. For example, the emulsion polymers made and used in coating compositions according to the teachings contained herein is described throughout the present disclosure in conjunction with an architectural paint in order to more fully illustrate the composition and the use thereof. The incorporation and use of such emulsion polymers as coating compositions used in other applications as an adhesive, a caulk, a sealant, a mastic, or the like are contemplated to be within the scope of the present disclosure. It should be understood that throughout the description, corresponding reference numerals or letters indicate like or corresponding parts and features.

In the context of the present disclosure, washability or stain removal refers to a coating's ability to withstand a scrubbing action that removes the staining material(s) without changing the coating's appearance or protective function. The term "nonionic monomer" as used herein is meant to indicate that the monomer does not bear an ionic charge within the pH range of 2 to 10.

The present disclosure generally provides emulsion polymers and coating compositions made therefrom, as well as uses thereof. The emulsion polymers comprise, consist of, or consist essentially of an emulsion polymer having, as polymerized units:
  a) at least one ethylenically unsaturated nonionic monomer in an amount ranging between about 85 to less than 100 wt. % based on the overall weight of the polymer composition;
  b) a first acid monomer in an amount ranging from about 0.1 to 2 wt. %, the first monomer being a strong acid monomer selected as a phosphorus-based acid monomer, a sulfur-based acid monomer, or a mixture thereof, and
  c) a second acid monomer in an amount ranging from about 0.1 to 2 wt. %, the second monomer being one or more ethylenically unsaturated monomers having at least one carboxyl or carboxylic anhydride functional group.

The relative amounts of the first and second acid monomers in the emulsion polymer is selected such that the ratio of b/c is greater than 0.7. This emulsion polymer exhibits a glass transition temperature ($T_g$) that ranges from −30° C. to 30° C. and is polymerized in a reaction pH range of about 3 to 9. Alternatively, the glass transition temperature is between −10° C. to 30° C. The glass transition temperatures of the polymer phases can be calculated using the Fox equation:

$$1/Tg(\text{polymer})=W(a)/Tg(a)+W(b)/Tg(b)+\ldots,$$

where W(a) and W(b) are the weight fractions of comonomers (a) and (b) and Tg(a) and Tg(b) are the glass transition temperatures for homopolymers (a) and (b), respectively. Glass transition temperatures for various homopolymers are available in many literature sources, including J. Brandup and E. H. Immergut, Polymer Handbook, 3rd ed., John Wiley & Sons, New York, VI/209-277 (1989).

The ethylenically unsaturated nonionic monomer (a) is not limited to any specific ethylenically unsatured, nonionic monomer. The ethylenically unsaturated nonionic monomers may include, without limitation, (meth)acrylic ester monomers, such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; diacetone acrylamide, methylol (meth) acrylamide, glycidyl methacrylate, 4-hydroxybutyl acrylate glycidyl ether; amino-functional and ureido-functional monomers (e.g., Norsocryl® 104, Arkema Inc., King of Prussia, Pa.); monomers bearing acetoacetoxy-functional, acetoacetamido-functional, and/or cyanoacetamido-functional groups; styrene and substituted styrenes; butadiene; ethylene, propylene, a-olefins such as 1-decene; vinyl acetate, vinyl propionate, vinyl butyrate, vinyl versatate esters (e.g., VeoVa™ 10 and VeoVa™ 12 from Momentive Performance Materials, CT) and other vinyl esters; and vinyl monomers such as vinyl chloride, vinylidene chloride; monomers containing hydrolysable organo-silane such as trialkoxylsilane. Alternatively, the ethylenically unsaturated nonionic monomer is butyl acrylate, ethyl acrylate, methyl methacrylate, butyl methacrylate, unsubstituted or substituted styrene, or a mixture thereof.

The amount of the ethylenically unsaturated nonionic monomer is between about 85 and less than 100 wt. %, or preferably from 89 to 99.5, based on the entire weight of the emulsion polymer, wherein the term "about" refers to ±0.1, alternatively, ±0.05. Alternatively, the amount of the ethylenically, unsaturated nonionic monomer is within the range of about 92 to 99 wt. %; alternatively, between about 94 to 99 wt. %, or preferably greater than 96 wt. %.

The first acid monomer (b) is a strong acid monomer selected as one from the group of a phosphorus-based acid monomer, a sulfur-based acid monomer, or a mixture thereof. The amount of the first acid monomer in the emulsion polymer is within the range of 0.1 to 2 wt. %, or preferably 0.1 to 1.5 wt. %, based on the weight of the entire emulsion polymer. Alternatively, the amount of the first acid monomer is between about 0.5 and 1.5 wt. %, or 0.25 to 1.25 wt. %. When desirable, the amount of the first acid monomer is about 1 wt. %, wherein the term "about" refers to +0.1, alternatively, ±0.05.

The first acid monomer is not limited to any specific type of phosphate or sulfate monomer. Phosphate-based monomers include, but are not limited to, phosphoalkyl (meth) acrylates or acrylates, phospho alkyl (meth)acrylamides or acrylamides, phosphoalkyl crotonates, phosphoalkyl maleates, phosphoalkyl fumarates, phosphodialkyl (meth) acrylates, phosphodialkyl crotonates, vinyl phosphates and (meth)allyl phosphate, phosphate esters of polypropylene glycol mono(meth)acrylate or polyethylene glycol mono (meth)acrylate, polyoxyethylene allyl ether phosphate, vinyl phosphonic acid, allyl phosphonic acid, 2-acrylamido-2-methylpropanephosphinic acid, 2-methacrylamido-2-methylpropanephosphinic acid, alpha-phosphonostyrene, (hydroxyl)phosphinylmethyl methacrylate, and salts thereof. Sulfate-based monomers include, without limitation, vinyl- and allyl-sulfonic or sulfuric acids, sulfoethyl (meth)acrylate, aryl-sulfonic or sulfuric acids, (meth)acrylamidoethane-sulfonic or sulfuric acids, methacrylamido-2-methyl propane-sulfonic or sulfuric acids, and the alkali metal salts of sulfonic and sulfuric acids, sodium styrene sulfonate, or vinyl sulfonic acid. Alternatively, the first acid monomer is an alkyl methacrylate phosphate, such as ethyl methacrylate phosphate (PAM1); phosphate esters of polyethylene glycol mono(meth)acrylate; phosphate esters of polypropylene glycol mono(meth)acrylate (PAM2); or mixtures thereof. Specific examples of preferred phosphate monomers include, but are not limited to Sipomer® PAM 4000, Sipomer® PAM 300, Sipomer® PAM 200 and Sipomer® PAM 100 (Solvay), respectively.

The second acid monomer (c) includes one or more ethylenically unsaturated monomers that have at least one carboxyl or carboxylic anhydride functional group. The amount of the second acid monomer in the emulsion polymer is within the range of 0.1 to 2 wt. %, based on the weight of the entire emulsion polymer. Alternatively, the amount of the second acid monomer is between about 0.1 and 1.5 wt. %. When desirable, the amount of the second acid monomer is between about 0.25 and about 1.0 wt. %, wherein the term "about" refers to ±0.1, alternatively, ±0.05.

The second acid monomer is not limited to any specific ethylenically unsaturated monomer. Several examples of this type of monomer include without limitation, ethylenically unsaturated carboxylic or dicarboxylic acids or amides, especially N-alkylolamides or hydroxyalkyl esters of the above mentioned carboxylic acids. Alternatively, the second acid monomer is (meth)acrylic acid, maleic acid, fumaric acid, crotonic acid, citraconic acid, cinnamic acid, acrylic acid, or itaconic acid, with methacrylic acid being preferred.

In the emulsion polymer of the present disclosure, the ratio (b/c) of the first acid monomer to the second acid monomer is at least 0.7. Alternatively, the ratio b/c is between about 1 and 10; alternatively, the ratio b/c is between about 1 to 5, preferably between 1 to 4, more preferably about 1.0 to 2.0, wherein the term "about" refers to ±0.3, alternatively, ±0.1.

A non-exhaustive list of possible monomer combinations that may be polymerized or used to form the emulsion polymers according to the teachings of the present disclosure is provided in Table 1. The monomers associated with the abbreviations used in Table 1 include: butyl acrylate (BA); methyl methacrylate (MMA); another acrylic monomer (AM); ethylmethacrylate phosphate (PAM1); phosphate esters of polypropylene glycol monomethacrylate (PAM2); and methacrylic acid (MAA).

TABLE 1

Several Specific Combinations of Monomers Used to Form Emulsion Polymers

| Ethylenically Unsaturated Nonionic Monomer | First Acid Monomer | Second Acid Monomer |
|---|---|---|
| BA, MMA, AM | PAM1 | MAA |
| BA, MMA, AM | PAM2 | MAA |
| BA, MMA, AM | PAM1, PAM2 | MAA |

According to one aspect of the present disclosure, coating compositions comprising the emulsion polymers dispersed in an aqueous medium are formed. The emulsion polymers are incorporated into the coating compositions in an amount ranging from about 5 wt. % to 70 wt. % based on the total weight of the coating composition; alternatively, between about 10 wt. % and 60 wt. %, preferably between about 20 to 55 wt. %. Alternatively, the amount of the emulsion polymers present in the coating composition is greater than about 10 wt. %; alternatively, less than about 55 wt. %, based on the total weight of the coating composition.

The coating compositions may further comprise a dye, a pigment, or a mixture thereof. These pigments may act as colorants, fillers, or extenders with several specific examples including, but not being limited to, carbon black, colored organic pigments, and metal oxide pigments, such as titanium dioxide, zinc oxide, clay, aluminum silicate, zinc oxide, zinc hydroxide, aluminum silicate, magnesium silicate, calcium silicate, amorphous silica, vapor phase silica, colloidal silica, alumina, aluminum hydroxide, zirconium oxide, and cerium oxide, as well as calcium carbonate, magnesium carbonate, kaolin, clay, talc, calcium sulfate, barium sulfate, and zinc carbonate.

When desirable, the coating compositions may also comprise one or more additives, including, but not limited to, surfactants, dispersants, rheology modifiers, defoamers, coalescent agents, or opacifiers. Various surfactants and defoamers may include any organic, organosilicon, and silicone molecules that are well known to one skilled-in-the-art to function in such a capacity. In order to enhance the weatherability of the film or coating formed from the coating composition, the coating composition may include hindered amines or UV absorber molecules. Several specific examples of surfactants or dispersants include without limitation ionic and nonionic compounds, such as alkyl polyglycol ethers, alkyl phenol polyglycol ethers, alkali metal or ammonium salts of alkyl, aryl or alkylaryl sulfonates, sulfates, phosphates, and the like.

The coating compositions may be applied to the surface of a substrate by any conventional application method known to one skilled in the art, including but not limited to brushing, draw-down methodology, spin coating, dip coating, flow coating, curtain coating, roller application, and spray methodology, for example, air spray, air-assisted spray, airless spray, high volume low pressure (HVLP) spray, and air-assisted airless spray. Films or coating layers formed using these coating compositions exhibit excellent resistance to a wide range of hydrophilic and hydrophobic stains. Conventional coating formulations are often optimized for hydrophobic stain washability at the expense of hydrophilic stain removal and vice versa. One benefit associated with the emulsion polymers of the present disclosure and the coating formulations formed therefrom is the capability of providing for the efficient or clean removal of both hydrophilic and hydrophobic stains.

According to another aspect of the present disclosure, in one embodiment an emulsion polymer comprising, as polymerized units:
a) at least one ethylenically unsaturated nonionic monomer in an amount ranging between about 85 wt. % to less than 100 wt. % based on the overall weight of the polymer composition;
b) a first acid monomer in an amount ranging from about 0.1 to 2 wt. %, the first monomer being a strong acid monomer selected as a phosphorus-based acid monomer, a sulfur-based acid monomer, or a mixture thereof, and
c) a second acid monomer in an amount ranging from about 0.1 to 2 wt. %, the second monomer being one or more ethylenically unsaturated monomers having at least one carboxyl or carboxylic anhydride functional group;

is provided wherein the relative amounts of the first and second acid monomers are such that the ratio of b/c is greater than 0.7 and the polymer composition has a glass transition temperature ($T_g$) ranging from −30° C. to 30° C. Alternatively, the ratio of b/c is between about 1 and about 10. When desirable, the ratio of b/c may be between about 1 and about 5. In this embodiment, the ethylenically unsaturated nonionic monomer is without limitation butyl acrylate, ethyl acrylate, methyl methacrylate, butyl methacrylate, styrene, acrylic monomer, or a mixture thereof. The Sipomer PAM series are the preferred strong acid or phosphate monomer. The first acid monomer may include, but not be limited to ethyl methacrylate phosphate, phosphate esters of polypropylene glycol monomethacrylate, or a mixture thereof and the second acid monomer is without limitation (meth)acrylic acid, maleic acid, fumaric acid, itaconic acid, crotonic acid, citraconic acid, cinnamic acid, with (meth)acrylic acid being preferred.

According to a second embodiment, a coating composition is provided that comprises the emulsion polymer described in the first embodiment above dispersed in an aqueous medium. The coating composition may further comprise an organic pigment, and inorganic pigment, or a mixture thereof. When desirable, the coating composition may also comprise one or more additives selected from the group of surfactants, dispersants, extenders, rheology modifiers, defoamers, coalescent agents, and opacifiers. The emulsion polymer is present in the coating composition in amount that ranges from about 10 to 50 wt. % based on the entire weight of the coating composition.

According to a third embodiment, a method of using the coating composition defined in the second embodiment above is provided, wherein the coating composition is applied to a surface of a substrate to form a film or coating layer on the surface that is resistant to both hydrophilic stains and hydrophobic stains. The hydrophilic stains include mustard, ketchup, wine, coffee, and fountain ink; while the hydrophobic stains include ballpoint pen, No. 2 pencil, blue crayon, grease pencil, lipstick #1 (CoverGirl Hot Passion), lipstick #2 (Maybelline Royal Red), and consumer union black stain. The total ΔE measured for the resistance of the coating composition to the hydrophilic and the hydrophobic stains is less than about 80.

The following specific examples are given to further illustrate the preparation and testing of emulsion polymers and coating formulations containing the emulsion polymers according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

1. An emulsion polymer comprising, as polymerized units:
   d) at least one ethylenically unsaturated nonionic monomer in an amount ranging between about 85 wt. % to less than 100 wt % based on the overall weight of the polymer composition;
   e) a first acid monomer in an amount ranging from about 0.1 to 2 wt. %, the first monomer being a strong acid monomer selected as a phosphorus-based acid monomer, a sulfur-based acid monomer, or a mixture thereof, and
   f) a second acid monomer in an amount ranging from about 0.1 to 2 wt. %, the second monomer being one or more ethylenically unsaturated monomers having at least one carboxyl or carboxylic anhydride functional group;
   wherein the relative amounts of the first and second acid monomers are such that the ratio of b/c is greater than 0.7;
   wherein the polymer composition has a glass transition temperature ($T_g$) ranging from −30° C. to 30° C.

2. The emulsion polymer according to Claim 1, wherein the ratio of b/c is between about 1 and about 10.

3. The emulsion polymer according to any of Claim 1 or 2, wherein the ratio of b/c is between about 1 and about 5.

4. The emulsion polymer according to any of Claims 1-3, wherein the ethylenically unsaturated nonionic monomer is C1-C18 alkyl (meth)acrylates, vinyl esters, styrene, or a mixture thereof.

5. The emulsion polymer according to any of Claims 1-4, wherein the first acid monomer is ethyl methacrylate phosphate, phosphate esters of polypropylene glycol monomethacrylate, or a mixture thereof and the second acid monomer is methacrylic acid.

6. A coating composition comprising an emulsion polymer dispersed in an aqueous medium, the emulsion polymer comprising, as polymerized units:
   a) at least one ethylenically unsaturated nonionic monomer in an amount ranging between about 85 wt. % to 99.5 wt. % based on the overall weight of the polymer composition;
   b) a first acid monomer in an amount ranging from about 0.1 to 2 wt. %, the first monomer being a strong acid monomer selected as a phosphorus-based acid monomer, a sulfur-based acid monomer, or a mixture thereof, and
   c) a second acid monomer in an amount ranging from about 0.1 to 2 wt. %, the second monomer including at least one ethylenically unsaturated monomer having at least one carboxyl or carboxylic anhydride functional group;
   wherein the relative amounts of the first and second acid monomers are such that the ratio of b/c is greater than 0.7;
   wherein the polymer composition has a glass transition temperature ($T_g$) ranging from −30° C. to 30° C.

7. The coating composition according to Claim 6, wherein the ratio of b/c is between about 1 and about 10.

8. The coating composition according to any of Claim 6 or 7, wherein the ratio of b/c is between about 1 and about 5.

9. The coating composition according to any of Claims 6-8, wherein the ethylenically unsaturated nonionic monomer is C1-C18 alkyl (meth)acrylates, vinyl esters, styrene, or a mixture thereof.

10. The coating composition according to any of Claims 6-9, wherein the first acid monomer is ethylmethacrylate phosphate, phosphate esters of polypropylene glycol monmethacrylate, or a mixture thereof and the second acid monomer is methacrylic acid.

11. The coating composition according to any of Claims 6-10, wherein the coating composition further comprises an organic pigment, and inorganic pigment, or a mixture thereof 12. The coating composition according to any of Claims 6-11, wherein the coating composition further comprises one or more additives selected from the group of surfactants, dispersants, extenders, rheology modifiers, defoamers, coalescent agents, and opacifiers.

13. The coating composition according to any of Claims 6-12, wherein the emulsion polymer is present in an amount ranging from about 10 to 50 wt. % based on the entire weight of the coating composition.

14. A method of using the coating composition of any of Claims 6-13, wherein the coating composition is applied to a surface of a substrate to form a film or coating layer on the surface;

wherein the film or coating layer is resistant to both hydrophilic stains and hydrophobic stains;

wherein the hydrophilic stains include mustard, ketchup, wine, coffee, and fountain ink;

wherein the hydrophobic stains include ballpoint pen, No. 2 pencil, blue crayon, grease pencil, lipstick #1(CoverGirl Hot Passion), lipstick #2 (Maybelline Royal Red), and consumer union black stain.

15. The method according to claim 14, wherein the total ΔE measured for the resistance of the coating composition to the hydrophilic and the hydrophobic stains is less than about 80

Example 1: Emulsion Polymer Composition and Method for Preparing Thereof

A total of 17.9 gram of a seed latex and 495 gram water is added into a three-liter, jacketed glass reactor equipped with dual impellers, reflux condensers, and stainless steel feed lines. The reactor is then heated to 65° C. A monomer mixture containing 594.5 gram butyl acrylate, 526.2 gram methyl methacrylate, 23.6 gram Norsocryl® 104 (Arkema Inc., King of Prussia, Pa.), and 8.7 gram methacrylic acid are combined with water and then emulsified using equal active amounts of sodium dodecylbenzene sulfonate and alkyldiphenyloxide disulfonate under agitation.

The polymerization is initiated at 65° C. using t-butyl hydroperoxide (t-BHP) solution as an oxidizer and sodium metabisulfite (SMBS) as a reducer. Commencing simultaneously, monomer pre-emulsion, ammonium hydroxide solution, oxidizer and reducer solutions are fed to the reactor over a period of 210 minutes and 220 minutes, respectively. Then, additional t-BHP and SMBS solutions are fed over 60 minutes to lower the amount of residual monomers. The pH of the resulting latex is adjusted to 8.0-9.0 with 28% ammonium hydroxide. The solid content of the latex is ~50%. The emulsion polymer may then be collected or stored as an aqueous dispersion or latex.

Example 2: Emulsion Polymer Composition and Method for Preparing Thereof

Polymer dispersions are prepared using the same procedure as described in Example 1, except that phosphate monomer (PAM1 or PAM2) is included and the amounts of MAA, PAM1 or PAM2 are varied as shown in Table 2.

TABLE 2

Polymer Samples 1-6: Synthesis of Acrylic Emulsion Polymers (in grams)

| Monomers | 1 | 2 | 3 | 4 | 5 |
|---|---|---|---|---|---|
| BA | 594.5 | 596.6 | 596.6 | 596.6 | 596.6 |
| MMA | 526.2 | 512.6 | 512.6 | 512.6 | 512.6 |
| AM | 23.6 | 23.6 | 23.6 | 23.6 | 23.6 |
| PAM1 | 0 | 5.7 | 0 | 11.5 | 0 |
| PAM2 | 0 | 0 | 5.7 | 0 | 11.5 |
| MAA | 8.7 | 8.7 | 8.7 | 8.7 | 8.7 |

BA = butyl acrylate,
MMA = methyl methacrylate,
MAA—methacrylic acid,
AM = Norsocryl ® 104;
PAM1 = Sipomer ® PAM 4000
PAM2 = Sipomer ® PAM 200

Example 3: Paint Samples Formed Using the Emulsion Polymer Compositions

The emulsion polymer samples 1-5 prepared in Example 2 are used in the preparation of paint samples A-E. Each paint sample, which is comprised of the composition described in Table 3, is prepared using the same procedure as described in Example 1, with the only exception being the composition of the emulsion polymer sample incorporated therein. Each paint sample is prepared by mixing the titanium dioxide slurry with coalescent, dispersant and water using a dispersator at low speed, followed by additions of ammonia, defoamer, and extender pigments. The mixture of above ingredients was then mixed at a higher speed till an acceptable Hegman fineness reading was achieved. The dispersator speed was then reduced and final additions of opaque polymer and thickeners were made to produce the paint base. The paint base was weighed out into pint-sized cans, to which appropriate amounts of latex, coalescent, and water were added. Paints were stirred on a bench top lab mixer for 5 minutes before initial KU viscosity and pH were measured.

TABLE 3

Composition for Paint Samples A-E.

| | Materials | Amount (grams) |
|---|---|---|
| Grind | Water | 75.8 |
| | Rutile TiO2 Slurry | 287.6 |
| | Nonionic Surfactant | 3 |
| | Ammonia AQ 28% | 0.5 |
| | Pigment Dispersant | 16.7 |
| | Sodium-Potassium Alumina Silicate Extender | 172.3 |
| | Calcined Kaolin Extender | 98.5 |
| | Attagel ® Rheology Modifier | 3 |
| | Defoamer | 1 |
| Let Down | Emulsion Polymer Sample (1, 2, 3, 4, 5, or 6) | 324 |
| | Aquaflow ® NHS310 Rheology Modifier | 20.7 |
| | Polyurethane Rheology Modifier | 5.4 |
| | Coalescent | 6.6 |
| | Opacifier | 41.2 |
| | Water | 118.7 |

Example 4: Testing the Stain Resistance of Paint Samples

The Paint Samples A-E as prepared in Example 3 are evaluated for resistance to staining. Stain resistance is measured by determining the degree to which a stain can be removed from a film or coating layer according to a modified ASTM D-4828 method. More specifically, a 7-mil wet paint film is cast onto a black Leneta scrub chart and dried for a minimum of three days in a controlled temperature & humidity (CT/CH) chamber. Five hydrophilic stains (mustard, ketchup, hot coffee, red wine, and blue fountain ink) and seven hydrophobic stains (ball point pen, #2 pencil, blue crayon, grease pencil, and two red lipsticks, as well as the Consumers Union black stain), are included in the test. Mustard, ketchup, and Consumer Union (CU) black stains are applied using a 10 mil square draw-down bar. For coffee, red wine, and fountain ink, a strip of a single ply paper towel is used to hold the liquid stains in place. Other hydrophobic stains are directly marked onto the scrub panels.

All stains are allowed to sit on the paint film for two hours while the Consumers Union (CU) stain is held in place for 24 hours. The films are washed for 100 cycles using ASTM standard sponges and Leneta standardized Non-Abrasive Scrub Media as the cleaning solution. Fantastik® (S.C. Johnson Company) is the cleanser for the CU stain, which is washed for 25 cycles on a Gardner Wear Abrasion machine. The degree of staining is assessed using the ΔE values of unstained versus stained and then washed portions of the paint film, measured by a BYK Gardner spectrophotometer. The measurement is taken in triplicate and then averaged. Small ΔE values are desirable, denoting slight or no residual staining of the paint surface. The measurement of the ΔE associated with each type of stain formed on and removed from the different paint samples is provided in Table 4.

TABLE 4

The Measurement of ΔE for Various Stains Removed From Paint Samples A-E

| Paint Sample | A | B | C | D | E |
|---|---|---|---|---|---|
| Emulsion Sample | 1 | 2 | 3 | 4 | 5 |
| b/c (PAM/MAA) | 0 | 0.66 | 0.66 | 1.32 | 1.32 |
| Hydrophilic Stain Removal (ΔE) | | | | | |
| Mustard | 11.94 | 11.07 | 11.71 | 9.47 | 8.87 |
| Ketchup | 0.84 | 1.65 | 1.70 | 1.21 | 0.94 |
| Wine | 7.78 | 6.45 | 6.91 | 4.66 | 4.35 |
| Coffee | 9.03 | 8.81 | 9.01 | 8.02 | 7.84 |
| Fountain Ink | 16.95 | 9.35 | 11.32 | 8.14 | 8.74 |
| Hydrophobic Stain Removal (ΔE) | | | | | |
| Ballpoint pen | 8.14 | 6.57 | 4.79 | 5.49 | 4.70 |
| No. 2 pencil | 2.12 | 3.10 | 2.45 | 2.05 | 1.95 |
| Blue Crayon | 10.04 | 9.77 | 11.63 | 10.46 | 8.18 |
| Grease Pencil | 15.46 | 16.89 | 15.05 | 15.18 | 14.83 |
| Lipstick #1 | 3.25 | 3.35 | 3.21 | 1.51 | 1.24 |
| Lipstick #2 | 1.56 | 1.65 | 1.51 | 1.34 | 0.93 |
| Consumer Union Stain | 2.75 | 1.69 | 2.12 | 1.16 | 1.12 |

Referring to Table 4, in comparison to paint samples A, B, or C, paint samples D and E consistently provides higher resistance to each hydrophilic stain without significant changes of the hydrophobic stain removal. In other words, the individual ΔE values measured for the removal of the same stains on paint samples A-C are observed to be usually higher than the corresponding values measured for paint samples D and E. The ratio of b/c in paint samples A-C is less than 0.7, while the ratio of b/c in paint samples D and E is greater than 0.7.

A summary of the total value of the measured ΔE for paint samples A-E is provided in Table 5. The total ΔE measured for the resistance of the coating composition (e.g., removal of the stain from the coating composition) to a combination of the hydrophilic stains and hydrophobic stains is less than about 80 for paint samples D and E; alternatively, less than about 75; alternatively, between about 10 and 80, wherein about refers to +3; alternatively, ±1. The total ΔE measured for the resistance of the coating composition in Samples D and E to the hydrophilic stains is less than about 45; alternatively, less than about 40; alternatively, less than about 35. The total ΔE measured for the resistance of the coating composition in Samples D and E to the hydrophobic stains is less than about 45; alternatively, less than about 40. In comparison, the total ΔE values measured for the removal of the same stains on paint samples A-C are observed to be usually higher than the values measured for paint samples D and E.

TABLE 5

Summary of Total Stain Removal (ΔE) From Paint Samples A-E

| Paint Sample | A | B | C | D | E |
|---|---|---|---|---|---|
| Emulsion Sample | 1 | 2 | 3 | 4 | 5 |
| b/c (PAM/MAA) | 0 | 0.66 | 0.66 | 1.32 | 1.32 |
| ΔE - Total Hydrophilic Stains | 46.54 | 37.34 | 40.65 | 31.50 | 30.74 |
| ΔE - Total Hydrophobic Stains | 43.32 | 43.02 | 40.76 | 37.19 | 32.95 |
| Total ΔE (Hydrophilic and Hydrophobic Stains) | 89.86 | 80.35 | 81.41 | 68.69 | 63.69 |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An emulsion polymer comprising, as polymerized units:
   a) at least one ethylenically unsaturated nonionic monomer in an amount ranging between about 85 wt % to less than 100 wt % based on an overall weight of the emulsion composition;
   b) a first acid monomer in an amount ranging from about 0.1 to 2 wt %, wherein the first acid monomer is a strong acid monomer selected from the group consisting of phosphate esters of polypropylene glycol mono (meth)acrylate, phosphate esters of polyethylene glycol mono(meth)acrylate, and a mixture thereof, and
   c) a second acid monomer in an amount ranging from about 0.1 to 1 wt %, wherein the second acid monomer is methacrylic acid;
   wherein relative amounts of the first and second acid monomers are such that a ratio of b/c is about 1.0 to 2.0 and a total amount of b plus c is less than or equal to 2 wt %;
   wherein the at least one ethylenically unsaturated nonionic monomer a) comprises at least three different monomers selected from the group consisting of methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate;
   (meth)acrylonitrile; (meth)acrylamide; diacetone acrylamide, methylol (meth)acrylamide, glycidyl methacrylate, 4-hydroxybutyl acrylate glycidyl ether; ureido-functional monomers, monomers bearing acetoacetoxy-functional, acetoacetamido-functional, and/or cyanoacetamido-functional groups, styrenes, substituted styrenes, butadiene, ethylene, propylene, 1-decene, vinyl acetate, vinyl propionate, vinyl butyrate, vinyl versatate esters, vinyl chloride, vinylidene chloride, vinyl esters, or a mixture thereof; and wherein the emulsion polymer has a glass transition temperature ($T_g$) ranging from 30° C. to 30° C. and is polymerized in a reaction pH range of about 3 to 9.

2. The emulsion polymer according to claim 1, wherein at least one of the at least three different monomers a) is selected from the group consisting of methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, vinyl esters, styrene, or a mixture thereof.

3. A coating composition comprising an emulsion polymer dispersed in an aqueous medium, the emulsion polymer comprising, as polymerized units:
  a) at least one ethylenically unsaturated nonionic monomer in an amount ranging between about 85 wt % to less than 100 wt % based on an overall weight of the emulsion composition;
  b) a first acid monomer in an amount ranging from about 0.1 to 2 wt %, wherein the first acid monomer is a strong acid monomer selected from the group consisting of phosphate esters of polypropylene glycol mono(meth)acrylate, phosphate esters of polyethylene glycol mono(meth)acrylate, and a mixture thereof, and
  c) a second acid monomer in an amount ranging from about 0.1 to 1 wt %, wherein the second acid monomer is methacrylic acid;
  wherein relative amounts of the first and second acid monomers are such that a ratio of b/c is about 1.0 to 2.0 and a total amount of b plus c is less than or equal to 2 wt %;
  wherein the at least one ethylenically unsaturated nonionic monomer a) comprises at least three different monomers selected from the group consisting of methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate;
  (meth)acrylonitrile; (meth)acrylamide; diacetone acrylamide, methylol (meth)acrylamide, glycidyl methacrylate, 4-hydroxybutyl acrylate glycidyl ether; ureido-functional monomers, monomers bearing acetoacetoxy-functional, acetoacetamido-functional, and/or cyanoacetamido-functional groups, styrenes, substituted styrenes, butadiene, ethylene, propylene, 1-decene, vinyl acetate, vinyl propionate, vinyl butyrate, vinyl versatate esters, vinyl chloride, vinylidene chloride, vinyl esters, or a mixture thereof; and
  wherein the emulsion polymer has a glass transition temperature ($T_g$) ranging from 30° C. to 30° C. and is polymerized in a reaction pH range of about 3 to 9.

4. The coating composition according to claim 3, wherein at least one of the at least three different monomers a) is selected from the group consisting of methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, vinyl esters, styrene, or a mixture thereof.

5. The coating composition according to claim 3, wherein the coating composition further comprises an organic pigment, and inorganic pigment, or a mixture thereof.

6. The coating composition according to claim 3, wherein the coating composition further comprises one or more additives selected from the group consisting of surfactants, dispersants, extenders, rheology modifiers, defoamers, coalescent agents, and opacifiers.

7. The coating composition according to claim 3, wherein the emulsion polymer is present in an amount ranging from about 10 to 50 wt % based on an entire weight of the coating composition.

8. A method of applying the coating composition of claim 3 to a substrate, said method comprising a step of applying the coating composition to a surface of a substrate to form a film or coating layer on the surface;
  wherein the film or coating layer is resistant to both hydrophilic stains and hydrophobic stains.

9. The method according to claim 8, wherein a total $\Delta E$ measured for a resistance of the coating composition to both the hydrophilic stains and hydrophobic stains is less than about 80;
  wherein the hydrophilic stains include mustard, ketchup, wine, coffee, and fountain ink;
  wherein the hydrophobic stains include ballpoint pen, No. 2 pencil, blue crayon, grease pencil, lipstick #1, lipstick #2, and a Consumers Union stain.

10. The method according to claim 9, wherein the total $\Delta E$ measured for the resistance of the coating composition to both the hydrophilic and hydrophobic stains is less than about 70.

11. The method according to claim 8, wherein a total $\Delta E$ measured for a resistance of the coating composition to hydrophilic stains is less than about 35.

12. The method according to claim 8, wherein a total $\Delta E$ measured for a resistance of the coating composition to hydrophobic stains is less than about 40.

* * * * *